United States Patent [19]

Reinsch

[11] Patent Number: 5,986,814
[45] Date of Patent: Nov. 16, 1999

[54] HIGH CONTRAST, COMPACT, FULL-COLOR POLARIZER AND COLOR BEAM SPLITTER

[75] Inventor: Stephen J. Reinsch, Vista, Calif.

[73] Assignee: Hughes-JVC Technology Corporation, Carlsbad, Calif.

[21] Appl. No.: 08/964,348

[22] Filed: Nov. 4, 1997

Related U.S. Application Data

[63] Continuation of application No. 08/754,292, Nov. 20, 1996, abandoned.

[51] Int. Cl.$^6$ .................................................. G02B 27/14
[52] U.S. Cl. ............................................................. 359/634
[58] Field of Search ..................... 359/634, 640, 359/638, 633; 348/8, 9; 353/31, 48, 49

[56] References Cited

U.S. PATENT DOCUMENTS

| | | | |
|---|---|---|---|
| 4,035,836 | 7/1977 | Miyaji et al. | 358/55 |
| 4,058,827 | 11/1977 | Ando et al. | 358/55 |
| 4,164,752 | 8/1979 | Doi et al. | 358/55 |
| 4,589,015 | 5/1986 | Nataka et al. | 358/55 |
| 4,687,301 | 8/1987 | Ledebuhr | 359/634 |
| 4,857,997 | 8/1989 | Fukami et al. | 358/55 |
| 5,153,752 | 10/1992 | Kurematsu et al. | 359/40 |
| 5,363,222 | 11/1994 | Ledebuhr | 349/8 |
| 5,619,284 | 4/1997 | Magocs | 348/757 |
| 5,621,551 | 4/1997 | Henderson et al. | |
| 5,664,432 | 9/1997 | Doany | 359/634 |

FOREIGN PATENT DOCUMENTS

WO 94/23540  10/1994  WIPO .

*Primary Examiner*—Georgia Epps
*Assistant Examiner*—Ricky Mack
*Attorney, Agent, or Firm*—Harness, Dickey & Pierce, P.L.C.

[57] ABSTRACT

A high contrast polarizer and color beam splitter for use in a full color light valve projector includes a light source for providing input light on a first optical axis and first, second and third light valves for modulating light of first, second and third colors. The polarizer and color beam splitter includes a color and angle sensitive interface, located on the first optical axis, for reflecting at least part of the input light. A polarizer, located on a second optical axis, receives the input light reflected by the color and angle sensitive interface and reflects light of a first polarization along the second optical axis. A first color separator, located on the second optical axis at a first angle with respect to a plane orthogonal to the second optical axis, reflects light of the first color onto the color and angle sensitive interface. The color and angle sensitive interface transmits the light of the first polarization and the first color, received from the first color separating means, onto the first light valve. The polarizer and color beam splitter minimizes the angle of the first color separator to decrease the phase change and increase contrast while maintaining a compact size.

25 Claims, 2 Drawing Sheets

HIGH CONTRAST, COMPACT, FULL-COLOR POLARIZER AND COLOR BEAM SPLITTER

This is a continuation of U.S. patent application Ser. No. 08/754,292, filed Nov. 20, 1996, now abandoned.

BACKGROUND OF THE INVENTION

TECHNICAL FIELD

The present invention relates to light valve projection systems and, more particularly, to a high contrast, full-color polarizer and color beam splitter for use in a reflective light valve projection system.

DISCUSSION

Full-color birefringent mode reflective light valve projection systems usually employ three reflective light valves, one for each of the three primary colors. A is polarizer and color beam splitter includes a polarizing beam splitter which splits input light into first and second polarization states and a color beam splitter which splits input light into the three colors for subsequent modulation by the light valves. The polarizer reflects or transmits light of the first polarization onto a first color beam splitter. Light of the second polarization state is transmitted or reflected by the polarizer and discarded.

The color beam splitter reflects light of the first color onto a first light valve and transmits light of the second and third colors. A second color beam splitter reflects light of the second color onto a second light valve and transmits light of the third color onto a third light valve.

In a particular embodiment three cathode ray tubes (CRTs), located adjacent the three birefringent mode photoactivated liquid crystal light valves, write a rear surface of each light valve to modulate the light incident upon the front surface thereof by means of a birefringent liquid crystal layer. Each light valve reflects incident light without a change in polarization or modulates (or rotates) the polarization of incident light when the CRT writes the rear side of the light valve. Other types of reflective mode birefringent light valves well know in the art could also be used.

Modulated and unmodulated light reflected by the light valves is reflected by or transmitted through the color beam splitters and returns to the polarizer. Modulated light is transmitted or reflected by the polarizer and output to the projection lens and screen. Unmodulated light is reflected or transmitted by the polarizer and discarded.

Full-color single lens projection systems employing conventional polarizer and color beam splitters have several drawbacks. Polarizer and color beam splitters which are compact in size have low contrast and correspondingly mediocre image quality. Polarizer and color beam splitters with high contrast are both bulky and costly. One problem adversely affecting both size and contrast is the requirement that the color and polarization beam splitters be positioned at angles with respect to each other. As a result of the angled orientation of the color and polarization beam splitters, the light valves must also be arranged at angles with respect to each other. The requirement that the angle be as small as possible while keeping the prism compact is an important factor in design.

The contrast of the polarizer and color beam splitter is also affected by the angle that the beam splitters are positioned with respect to incident light. As the angle between the color beam splitters and the incident light increases, the change in phase of the polarized light reflected by or transmitted through the color beam splitter also increases and the contrast of the projection system decreases.

Referring to FIG. 1, a light valve projection system 10 according to the prior art is illustrated. Light valve projection system 10 includes a polarizer and color beam splitter 14, light valves 18, 20 and 22 and CRTs 24, 26 and 28. Polarizer and color beam splitter 14 includes housing 30, a polarizer 34, a first color beam splitter 36, and a second color beam splitter 38. Index of refraction fluid can be used in the housing if desired.

Polarizer and color beam splitter 14 further includes an input window 42 through which input light is directed onto polarizer 34 and an output window 44 through which output light is directed onto a projection lens (not shown). Polarizer and color beam splitter 14 further includes windows 48, 50 and 52 situated adjacent each of the light valves 18, 20 and 28. A prepolarizer (not shown) is a separate component with a size slightly bigger than the area required for polarizer 34 in FIG. 1 A significant disadvantage with the prior art light valve projection system 10 is the relatively high angle "A" which first color beam splitter 36 makes relative to a plane orthogonal to second optical axis 56. In FIG. 1, angle "A" is approximately 21°. Likewise, second color beam splitter 38 is positioned at a relatively high angle "B" with respect to a plane orthogonal to second optical axis 56. In FIG. 1, angle "B" is approximately 29°.

To decrease angle "A", CRT 28 must be positioned more closely parallel to second optical axis 56. This, in turn, requires that polarizer 34 and input window 42 be positioned further to the left in FIG. 1 which increases the size of polarizer and color beam splitter 14 significantly. Because of the two relatively high angles "A" and "B", the change in phase of polarized light reflected by or transmitted through first and second color beam splitters is also relatively high. As a result, the contrast of the projection system is correspondingly low.

Therefore, a full-color polarizer and color beam splitter for use in a light valve projector which positions color beam splitters at relatively small angles to obtain high contrast is desirable. Further, a polarizer and color beam splitter for a light valve projection system which is small in size and simple to manufacture is also desirable.

SUMMARY OF THE INVENTION

A polarizer and color beam splitter according to the present invention provides a relatively compact polarizer and color beam splitter including color beam splitters which operate at low angles of incidence to minimize phase change and increase contrast. To that end, the polarizer and color beam splitter according to the invention employs a color and angle sensitive interface which acts as a prepolarizer at relatively high angles of incidence and which transmits light of one color at relatively low angles of incidence.

More particularly, a high contrast polarizer and color beam splitter according to the present invention for use in a full color projector includes a light source for providing input light on a first optical axis and first, second and third light valves for modulating light of first, second and third colors. The polarizer and color beam splitter includes a color and angle sensitive interface, located on the first optical axis, for reflecting one polarization state of the input light which has a high incidence angle. A polarizer, located on a second optical axis, receives the polarized input light reflected by the color and angle sensitive interface and reflects light of a first polarization state along the second optical axis. A first color separator, located on the second optical axis at a first angle with respect to a plane-orthogonal to the second optical axis, reflects light of the first color onto the color and angle sensitive interface. At low incidence angles the color and angle sensitive interface transmits almost all incident light of a certain color. The color and angle sensitive interface transmits the light of the first polarization and the first color, received from the first color separating means, onto the first light valve. Placing the first light valve behind the color and angle sensitive interface decreases the angle of the first color separator with respect to the second optical axis to decrease the phase change and increase contrast while maintaining a compact size.

Other objects, features and advantages will be readily apparent.

BRIEF DESCRIPTION OF THE DRAWINGS

The various advantages of the present invention will become apparent to those skilled in the art after studying the following specification and by reference to the drawings in which.

DETAILED DESCRIPTION OF THE INVENTION

Figure 1:
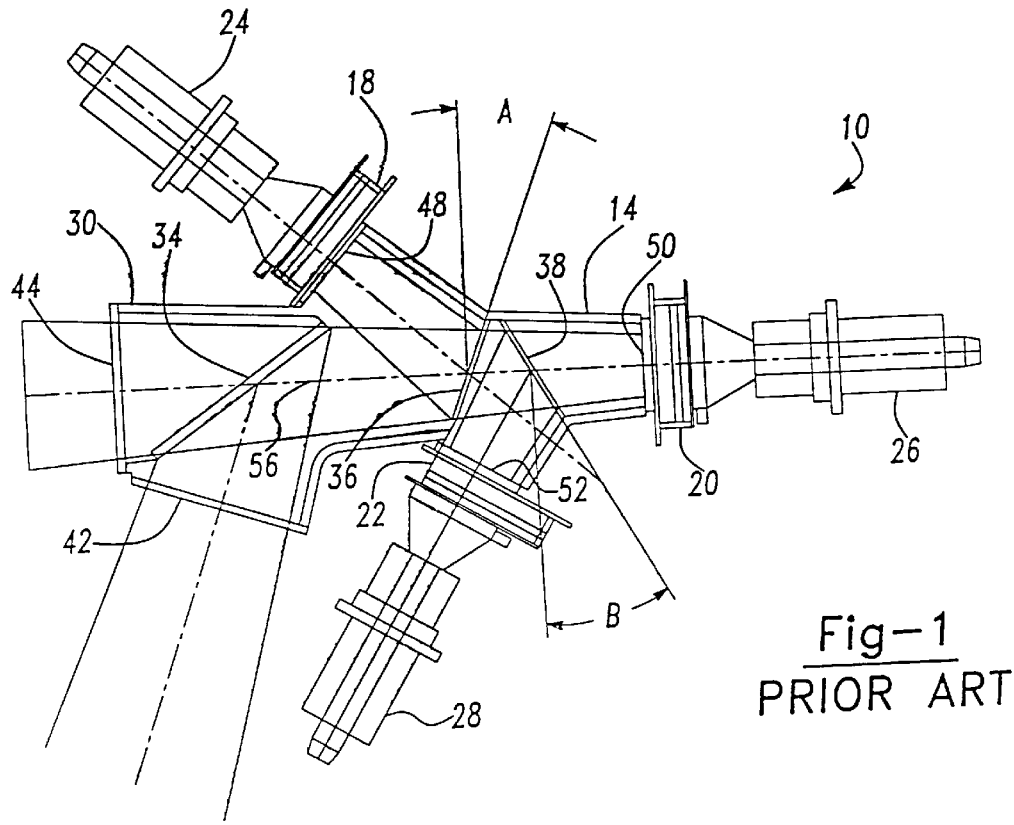
FIG. 1 is a plan view of a light valve projector with a polarizer and color beam splitter according to the prior art.
Figure 2:
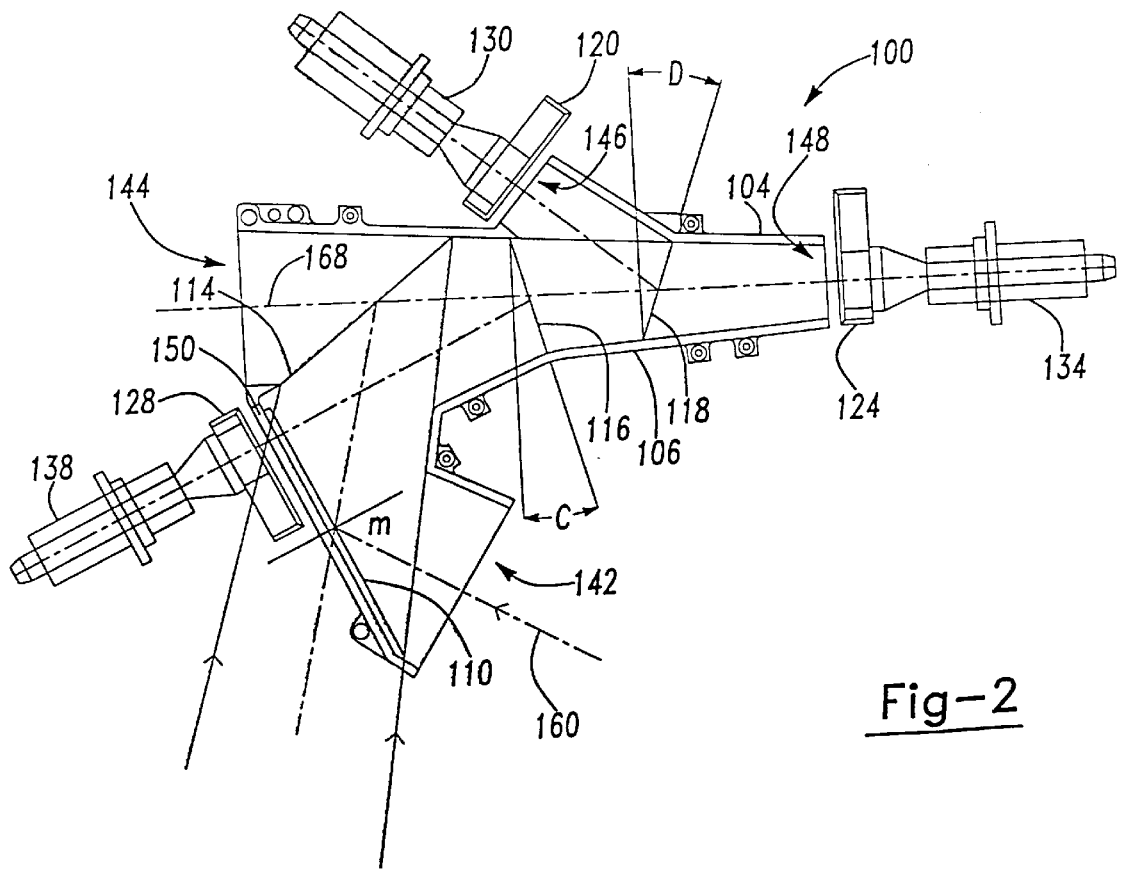
FIG. 2 is a plan view of a light valve projector incorporating a polarizer and color beam splitter according to the present invention.

Referring to FIG. 2, a light valve projection system 100 includes a polarizer and color beam splitter 104 according to the present invention. Polarizer and color beam splitter 104 includes a color and angle sensitive interface 110, a polarizer 114 and first and second color beam splitters 116 and 118 which are mounted and/or otherwise positioned by housing 106. Light valve projection system 100 includes reflective light valves 120, 124 and 128, each of which in a preferred embodiment, are modulated by cathode ray tubes (CRTs) 130, 134 and 138, respectively, in a conventional manner. Housing 106 includes an input opening or window 142, an output opening or window 144, and openings or windows 146, 148 and 150 associated with each of the light valves 120, 124 and 128. Housing 106 of polarizer and color beam splitter 110 can be filled with index of refraction fluid if desired. In a preferred embodiment the housing is filled with a highly transparent fluid with the index matched to the optics.

Color beam splitters 116 and 118 are preferably dichroic mirrors. The color and angle sensitive interface 110 is preferably formed by depositing a dichroic coating to form a polarizer and color beam splitter interface for white light at high incidence angles. The dichroic coating transmits light of a first color of both polarization states at low incidence angles. The dichroic coatings are deposited or otherwise formed on a substrate that is preferably the same index of refraction as a surrounding fluid. Alternately color and angle sensitive interface 110 could be deposited on a solid medium of the proper prism shape. Color and angle sensitive interface 110 performs several functions: surface 110 acts a prepolarizer for white input light at high angles of incidence; at low angles of incidence, surface 110 transmits light of a first color.

In a preferred embodiment, surface 110 acts as a polarizer at angles of incidence greater than 40° and transmits light at angles of incidence less than 10°. In a highly preferred embodiment, surface 110 acts as a polarizer for a light cone at 54.60° and transmits light of both polarization states at angles less than 5°.

Polarizer and color beam splitter 104 includes a first main optical axis 160 and a second main optical axis 168. First color beam splitter 116 is positioned at an angle "C" relative to a plane orthogonal to second main optical axis 168. Second color beam splitter 118 is positioned at an angle "D" relative to a plane orthogonal to second optical axis 168. As can be appreciated, polarizer and color beam splitter 104 minimizes angles "C" and "D" to increase contrast while maintaining compact dimensions and simple construction.

Figure 3:
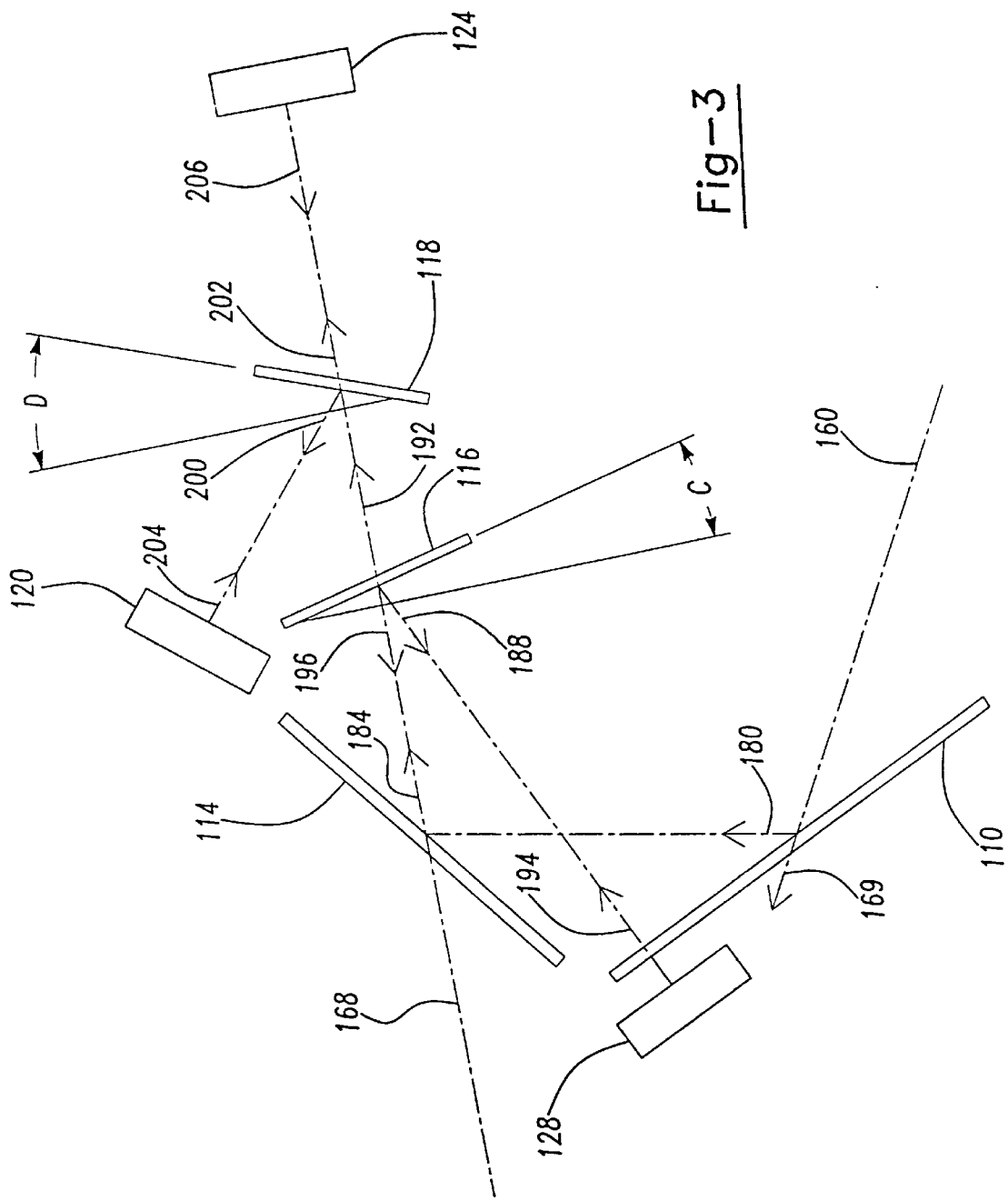
FIG. 3 illustrates the path of input light for a first color channel in the polarizer and color beam splitter of FIG. 2.

With reference to FIGS. 2 and 3, the operation of polarizing beam splitter is as follows: Input light is directed along first main optical axis 160, through input window 142 and onto surface 110 at an angle "E" relative to a plane orthogonal to a inner side of color and angle sensitive interface 110.

Color and angle sensitive interface 110 acts as a prepolarizer. Surface 110 reflects light having a first polarization and transmits light having a second polarization. Light, reflected by color and angle sensitive interface 110 and having the first polarization (arrow 180 in FIG. 3), is then reflected by polarizer 114 (arrow 184 in FIG. 3). Light 169 having a second polarization is transmitted by interface 110 and discarded by color and angle sensitive interface 110. Light, reflected by color and angle sensitive interface 110 and polarizer 114 and having the first polarization state (arrow 184 in FIG. 3), is directed along second main optical axis 168 towards first color beam splitter 116. First color beam splitter 116 reflects light having a first color towards light valve 128 (arrow 188 in FIG. 3) and transmits light having second and third colors towards second color beam splitter 118 (arrow 192 in FIG. 3).

Light having the first polarization state and the first color (arrow 188 in FIG. 3) passes through window 150 (FIG. 2) for modulation by light valve 128. Portions of light valve 128 where there is birefringence in the liquid crystal rotate the polarization of the incident light from the first polarization state to the second polarization state. Portions of light valve 128 where there is no birefringence in the liquid crystal simply reflect light of the first polarization state without a change in polarization.

The light reflected by light valve 128 (arrow 194 in FIG. 3) returns to first color beam splitter 116 which reflects the light along second main optical axis 168 to polarizer 114. Polarizer 114 reflects light of the first polarization state (unmodulated light) and transmits light having the second polarization state (modulated light) through output window 144 and onto a projection lens (not shown).

Light having the second and third colors (arrow 192 in FIG. 3) which was transmitted through first color beam splitter 116 is incident upon second color beam splitter 118. Second color beam splitter 118 reflects light having the second color towards second light valve 120 (arrow 200 in FIG. 3) and transmits light having a third color towards light valve 124 (arrow 202 in FIG. 3). Light valves 120 and 124 modulate light as previously described with respect to light valve 128.

Modulated and unmodulated light of the second color, reflected by light valve 120 (arrow 204 in FIG. 3), is reflected by second color beam splitter 118 and transmitted through first color beam splitter 116 (along second main optical axis 168) to polarizer 114.

Modulated and unmodulated light of the third color, reflected by light valve 124, is transmitted through second color beam splitter 118 and first color beam splitter 116 to polarizer 114. As previously described with respect to light of the first color, modulated light of the second and third colors passes through polarizer 114 whereas unmodulated light of the second and third colors is reflected and discarded by polarizers 114 and color and angle sensitive interface 110.

In a preferred embodiment, angle "C" lies between 20° and 13.5°. In a highly preferred embodiment, angle "C" is approximately equal to 13.5°. In a preferred embodiment, angle "D" lies between 30° and 20°. In a highly preferred embodiment, angle "D" is approximately equal to 20°. In a preferred embodiment, angle "E" lies between 40° and 60°. In a highly preferred embodiment, angle "E" is equal to 54.6°. However angles "C" and "D" may have been lower angles for a specific geometry.

Polarizer and color beam splitters are the main optic system for a light valve birefringent video projector. By increasing the contrast, the polarizer and color beam splitter 104 according to the invention greatly enhances picture quality. Polarizer and color beam splitter 104 is a high contrast, full-color polarizer and color beam splitter which is relatively compact and of simple construction. Conventional full-color polarizer and color beam splitters having comparable contrast are complicated and several times larger.

The polarizer and color beam splitter according to the invention achieves high contrast by maintaining relatively small angles between the optical axes and the color beam splitters. By doing so, the change in phase of the polarized light is minimized and the contrast of the system is maximized. As can be appreciated, light valve projection systems employing the polarizer and color beam splitter according to the invention can provide more realistic images due to the high contrast.

Various other advantages of the present invention will become apparent to those skilled in the art after having the benefit of studying the foregoing text and drawings, taken in conjunction with the following claims.

What is claimed is:

1. A high contrast polarizer and color beam splitter for use in a full-color image projector including a light source for providing input light on a first optical axis and first, second and third birefringent light valves for modulating light of first, second and third colors, comprising:

interface means, located on said first optical axis, for reflecting a first polarization state of said input light;

polarizing means, located on a second optical axis, for receiving said input light reflected by said interface means and for reflecting light of said first polarization along said second optical axis; and first color separating means, located on said second optical axis at a first angle with respect to a plane orthogonal to said second optical axis, for reflecting light of said first color onto said interface means, wherein said interface means transmits said light of said first polarization and said first color, received from said first color separating means, onto said first light valve.

2. The high contrast polarizer and color beam spliter of claim 1 where at least one of said first, second and third birefringent light valves is a photoactivated light valve addressed by CRT images.

3. The high contrast polarizer and color beam spliter of claim 2 where at least one of said first, second and third birefringent light valves is addressed by passive or active matrix techniques.

4. The high contrast polarizer and color beam splitter of claim 1 wherein said interface means reflects light of said first polarization state having an incident angle greater than a second angle and transmits light of said first and second polarization states having an incident angle less than a third angle.

5. The high contrast polarizer and color beam splitter of claim 1 wherein said interface means includes a multi-layer dielectric coating formed on a substrate.

6. The high contrast polarizer and color beam splitter of claim 1 wherein said first angle is less than 20°.

7. The high contrast polarizer and color beam splitter of claim 1 further comprising:

means for positioning said interface means relative to said polarizing means and said color separating means.

8. The high contrast polarizer and color beam splitter of claim 1 wherein said first color separating means transmits light having said second and third colors along said second optical axis.

9. The high contrast polarizer and color beam splitter of claim 8 further comprising:

second color separating means, located on said second optical axis at a fourth angle with respect to a plane orthogonal to said second optical axis, for reflecting light having said second color onto said second light valve and for transmitting light of said third color onto said third light valve.

10. The high contrast polarizer and color beam splitter of claim 9 wherein said fourth angle is less than 30°.

11. A method of providing a high contrast, full color image in a full-color light valve projector including a light source for providing input light on a first optical axis and first, second and third light valves for modulating light of first, second and third colors, comprising the steps of:

locating a color and angle sensitive interface on said first optical axis;

reflecting light of one polarization direction of said input light using said color and angle sensitive interface;

locating a polarizer on a second optical axis;

receiving said input polarized light reflected by said color and angle sensitive interface using said polarizer;

reflecting light of a first polarization along said second optical axis using said polarizer;

locating a first color separator on said second optical axis at a first angle-with respect to a plane orthogonal to said second optical axis;

reflecting light of said first color onto said color and angle sensitive interface using said first color separator; and transmitting said light of said first polarization and said first color through said color and angle sensitive interface and onto said first light valve.

12. The method of claim 11 further comprising the steps of:

reflecting light of said first polarization onto said polarizing means; and transmitting light of said second polarization using said color and angle sensitive interface.

13. The method of claim 11 further comprising the steps of:

reflecting light having an incident angle greater than a second angle; and transmitting light having a incident angle less than a third angle using said color and angle sensitive interface.

14. The method of claim 11 further comprising the step of:

forming said color and angle sensitive interface by depositing a coating on a substrate.

15. The method of claim 14 wherein said coating includes a multi-layer dielectric coating.

16. The method of claim 11 further comprising the step of:

adjusting said first angle to be less than 20°.

17. The method of claim 11 further comprising:

positioning said color and angle sensitive interface relative to said polarizer and said color separator using a housing.

18. The method of claim 11 comprising the step of:

transmitting light having said second and third colors along said second optical axis using said first color separator.

19. The method of claim 18 further comprising the steps of:

locating a second color separator on said second optical axis at a fourth angle with respect to a plane orthogonal to said second optical axis;

reflecting light having said second color onto said second light valve; and transmitting light of said third color onto said third light valve using said second color separator.

20. The method of claim 19 further comprising the steps of:

adjusting said fourth angle to be less that 30°.

21. A method of minimizing color separation angles in a polarizer and color beam splitter for use in a full color image projector including a light source and first, second and third birefringent light valves for modulating light of first, second and third colors, comprising the steps of:

providing input light on a first optical path;

reflecting a portion of said input light having a first polarization state along a second optical path;

reflecting said portion of light having said first polarization on a third optical path; and separating light having a first color from said portion of light having said first polarization state and reflecting said light having said first color and said first polarization state on a fourth optical path which crosses said second optical path.

22. The method of claim 21 further comprising the step of:

providing a color and angle sensitive interface that reflects light having a first polarization state at a high incidence angle and transmits light having said first polarization state or a second polarization state at low angles of incidence.

23. The method of claim 22 further comprising the steps of:

positioning said color and angle sensitive interface in said first and fourth optical paths;

reflecting said input light along said second optical path using said color and angle sensitive interface; and receiving light having said first color and said first polarization state.

24. The method of claim 23 further comprising the step of:

modulating said light having said first color and said first polarization state using said first birefringent light valve.

25. A light valve projection system for projecting a multi-color image onto a projection screen, comprising:

a light source for generating an input light that is directed along a first main optical axis;

a color and angle sensitive interface located on said first main optical access, said color and angle sensitive interface receiving said input light, reflecting a first polarization of said input light, and transmitting a second polarization of said input light;

a polarizer located on a second main optical axis, said polarizer receiving said first polarization of said input light reflected by said color and angle sensitive interface and reflecting said first polarization of said input light along a second main optical axis;

a first color beam splitter located on said second main optical axis at a first angle with respect to a plane orthogonal to said second optical axis, said first color beam splitter receiving said first polarization of said input light reflected by said polarizer, reflecting a first color light and transmitting a second color light and a third color light;

a first light valve that receives said first color light and generates a modulated first color light that is presented to said first color beam splitter, said first color beam splitter reflecting said modulated first color light along said second main optical axis to said polarizer, said polarizer reflecting said modulated first color light having said first polarization state and transmitting said modulated first color light having said second polarization state;

a second color beam splitter that receives said second color light and said third color light transmitted by said first color beam splitter, said second color beam splitter reflecting said second color light and transmitting said third color light;

a second light valve that receives said second color light and generates a modulated second color light that is presented to said second color beam splitter, said second color beam splitter reflecting said modulated second color light to said first color beam splitter, said first color beam splitter transmitting said modulated second color light to said polarizer, said polarizer reflecting said modulated second color having said first polarization state and transmitting said modulated second color having said second polarization state;

a third light valve that receives said third color light and generates a modulated third color light that is presented to said second color beam splitter, said second color beam splitter reflecting said modulated third color light to said first color beam splitter, said first color beam splitter transmitting said modulated third color light to said polarizer, said polarizer reflecting said modulated third color light having said first polarization state and transmitting said modulated second color light having said second polarization state; and a projection lens that receives said modulated first, second and third color light having said second polarization state from said polarizer, said projection lens combining said modulated first, second and third color light having said second polarization state and projecting the multi-color image formed thereby onto the projection screen.

* * * * *